(12) United States Patent  (10) Patent No.: US 7,039,772 B1
Zandonadi et al.  (45) Date of Patent: May 2, 2006

(54) SYSTEM, METHOD, AND COMPUTER PROGRAM PRODUCT FOR PROCESSING REFLECTIVE STATE MACHINES

(75) Inventors: Marco Zandonadi, Berkeley, CA (US); Roberto Attias, Richmond, CA (US); Akash R. Deshpande, San Jose, CA (US)

(73) Assignee: Teja Technologies, Inc., San Jose, CA (US)

( * ) Notice: Subject to any disclaimer, the term of this patent is extended or adjusted under 35 U.S.C. 154(b) by 367 days.

(21) Appl. No.: 10/371,829

(22) Filed: Feb. 20, 2003

Related U.S. Application Data

(60) Provisional application No. 60/433,348, filed on Dec. 12, 2002, provisional application No. 60/432,954, filed on Dec. 11, 2002, provisional application No. 60/432,928, filed on Dec. 11, 2002, provisional application No. 60/432,872, filed on Dec. 11, 2002, provisional application No. 60/432,785, filed on Dec. 11, 2002, provisional application No. 60/432,778, filed on Dec. 11, 2002, provisional application No. 60/432,757, filed on Dec. 11, 2002, provisional application No. 60/376,824, filed on Apr. 29, 2002, provisional application No. 60/359,453, filed on Feb. 22, 2002.

(51) Int. Cl.
   *G06F 12/00* (2006.01)
(52) U.S. Cl. .................. 711/158; 711/151; 711/154; 711/156
(58) Field of Classification Search ............... 711/158, 711/151, 154, 156
   See application file for complete search history.

(56) References Cited

U.S. PATENT DOCUMENTS

| | | | |
|---|---|---|---|
| 4,800,521 | A | 1/1989 | Carter et al. |
| 5,247,677 | A | 9/1993 | Welland et al. |
| 5,260,868 | A | 11/1993 | Gupta et al. |
| 5,301,312 | A | 4/1994 | Christopher et al. |
| 5,465,335 | A | 11/1995 | Anderson |
| 5,530,879 | A | 6/1996 | Crump et al. |
| 5,619,409 | A | 4/1997 | Schultz et al. |
| 5,636,124 | A | 6/1997 | Rischar et al. |
| 5,640,563 | A | 6/1997 | Carmon |
| 5,701,481 | A | 12/1997 | Hosaka et al. |
| 5,781,187 | A | 7/1998 | Gephardt et al. |
| 5,872,909 | A | 2/1999 | Wilner et al. |
| 5,938,708 | A | 8/1999 | Wallace et al. |
| 5,944,840 | A | 8/1999 | Lever |

(Continued)

OTHER PUBLICATIONS

IEEE, "The Authoritative Dictionary of IEEE Standards Terms," Seventh Edition, definition of the term "state machine".*

(Continued)

*Primary Examiner*—Stephen C. Elmore
(74) *Attorney, Agent, or Firm*—Dorsey & Whitney LLP

(57) ABSTRACT

Method, system, apparatus and computer program for processing a state machine. The method includes: coupling at least two attributes with a state machine selected from said at least one state machine; identifying at least one value corresponding with a first attribute selected from said at least two attributes; determining a processing order based on said at least one value to process at least one second attribute selected from said at least two attributes; and processing said second attribute according to said order.

23 Claims, 10 Drawing Sheets

U.S. PATENT DOCUMENTS

| | | |
|---|---|---|
| 6,105,048 A | 8/2000 | He |
| 6,279,108 B1 | 8/2001 | Squires et al. |
| 6,341,303 B1 | 1/2002 | Rhee et al. |
| 6,349,321 B1 | 2/2002 | Katayama |
| 6,359,622 B1 | 3/2002 | Hayes-Roth |
| 6,385,637 B1 | 5/2002 | Peters et al. |
| 6,385,638 B1 | 5/2002 | Baker-Harvey |
| 6,425,091 B1 | 7/2002 | Yang et al. |
| 6,438,573 B1 | 8/2002 | Nilsen |
| 6,606,691 B1 * | 8/2003 | Didier et al. ............... 711/151 |

OTHER PUBLICATIONS

Deshpande, et al., "The Shift Programming Language for Dynamic Networks of Hybrid Automata", *IEEE Transactions on Automatic Control,* Apr. 1998, 43(4): 584-587.

Deshpande, et al., "Viable Control of Hybrid Systems", *Hybrid Systems II,* Springer 1995.

Interrupt Driven Task Scheduler for Systems, *IBM Technical Disclosure Bulletin,* Mar. 1992, US.

\* cited by examiner

SYSTEM, METHOD, AND COMPUTER PROGRAM PRODUCT FOR PROCESSING REFLECTIVE STATE MACHINES

CROSS-REFERENCES TO RELATED APPLICATIONS

This application claims benefit of priority under 35 U.S.C. 119(e) and/or 35 U.S.C. 120 to:

U.S. Provisional Patent Application No. 60/359,453, entitled, "SYSTEM, METHOD, OPERATING MODEL AND COMPUTER PROGRAM PRODUCT FOR OPERATING SYSTEM FUNCTIONS FOR NETWORK PROCESSING", filed Feb. 22, 2002, Marco Zandonadi, et al. inventors;

U.S. Provisional Application, No. 60/376,824, entitled, "SYSTEM, METHOD, OPERATING MODEL AND COMPUTER PROGRAM PRODUCT FOR IMPROVING APPLICATION PERFORMANCE UTILIZING NETWORK PROCESSORS", filed Apr. 29, 2002, Mandeep S. Baines, et al., inventors;

U.S. Provisional Patent Application No. 60/432,778, entitled, "SYSTEM, METHOD, AND COMPUTER PROGRAM PRODUCT FOR MEMORY MANAGEMENT", filed Dec. 11, 2002, Marco Zandonadi, et al. inventors;

U.S. Provisional Patent Application No. 60/432,757, entitled, "SYSTEM, METHOD, AND COMPUTER PROGRAM PRODUCT FOR INTERRUPT SCHEDULING IN PROCESSING COMMUNICATION", filed Dec. 11, 2002, Marco Zandonadi, et al. inventors;

U.S. Provisional Patent Application No. 60/432,954, entitled, "SYSTEM, METHOD, AND COMPUTER PROGRAM PRODUCT FOR PROCESSING REFLECTIVE STATE MACHINES", filed Dec. 11, 2002, Marco Zandonadi, et al. inventors;

U.S. Provisional Patent Application No. 60/432,928, entitled, "SYSTEM, METHOD, AND COMPUTER PROGRAM PRODUCT FOR GENERATING AN INTERFACE", filed Dec. 11, 2002, Marco Zandonadi, et al. inventors;

U.S. Provisional Patent Application No. 60/432,872, entitled, "SYSTEM, METHOD, AND COMPUTER PROGRAM PRODUCT FOR TEMPLATE-BASED MULTI-PROTOCOL MESSAGING BETWEEN SYSTEMS", filed Dec. 11, 2002, Marco Zandonadi, et al. inventors;

U.S. Provisional Application, No. 60/432,785, entitled, "SYSTEM, METHOD, AND COMPUTER PROGRAM PRODUCT FOR SHARED MEMORY QUEUE", filed Dec. 11, 2002, Mandeep S. Baines, et al., inventors; and U.S. Provisional Application, No. 60/433,348, entitled, "SYSTEM, METHOD AND COMPUTER PROGRAM PRODUCT", filed Dec. 12, 2002, Akash R. Deshpande, et al., inventors; each of which applications are incorporated by reference herein.

Other related United States Patent Applications are co-pending U.S. patent application Ser. No. 10/371,830, entitled, "SYSTEM, METHOD, AND COMPUTER PROGRAM PRODUCT FOR MEMORY MANAGEMENT", filed Feb. 20, 2003, Marco Zandonadi, et al. inventors; and co-pending U.S. patent application Ser. No. 10/371,681 entitled, "SYSTEM, METHOD, AND COMPUTER PROGRAM PRODUCT FOR INTERRUPT SCHEDULING IN PROCESSING COMMUNICATION", filed Feb. 20, 2003, Marco Zandonadi, et al. inventors; each of which applications is hereby incorporated by reference.

FIELD OF THE INVENTION

The present invention relates, in general, to the field of operating systems and state machines and more particularly to reflective state machines.

BACKGROUND OF THE INVENTION

Many techniques for supporting network processing are known. Such techniques include generic memory management, interrupt scheduling, state machines, computer program code generation, and multi-protocol interfaces. The foundations of such processes are generally understood but in many cases their practical realization has fallen short of their potential.

A number of computer programs may be implemented as state machines. For example, a simple router state machine may be designed to route packets of information. The state machine may include a repetitious activity such as receiving a packet, identifying the destination address by performing a lookup, and forwarding the packet. Here the computer program is a potential candidate to be implemented as state machine.

A state machine exists in one state at a given time, and may transition to another state taking inputs into account. The state machine typically includes a finite number of states, a finite number of transitions, and a current state. A state machine is typically processed by evaluating the current state, inputs, potential transitions and corresponding guard conditions that may limit transitions. A simple router state machine may include three states: ready state, address state, and forward state. Receiving a packet while in the ready state may cause a transition to the address state. The destination address may be determined while in the address state, followed by a transition to the forward state. The forward state may then forward the received packet based on the identified address. After the packet is forwarded the state machine may transition back to the ready state to wait for another packet. The state machine may thereby provide an implementation of the computer program to receive a packet of information, identify the destination address and to forward the packet.

Typically a set of state machines may be generated to perform similar activities. Each individual state machine in the set of state machines may be scheduled for execution on a single computer processor. As an example, the previously described simple router state machine may be duplicated five times with each of the five state machines executing as five separate threads coupled with a single computer processor. The single computer processor typically performs context switching to execute each of these five threads. This context switching takes a considerable amount of processing resources. Unfortunately, conventional processing of operating system threads includes context switching between each thread without considering attributes and/or states associated with the thread.

Therefore conventional processing of is not efficient and there remains a need for a system, method, computer program, and computer program product for processing state machines that reduces the context switching problem. What is needed is an ability to overcomes the above and other disadvantages of known network processors.

BRIEF SUMMARY OF THE INVENTION

In summary, one aspect of the present invention is directed to a method including: coupling at least one attribute with a state machine selected from said at least one state machine; identifying at least one value corresponding with a first attribute selected from said at least one attribute; determining a processing order based on said at least one value to process at least one second attribute selected from said at least one attribute; and processing said second attribute according to said order. A system, router, computer program and computer program product are also disclosed.

The system, method, and computer program product for processing reflective state machines of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Reference will now be made in detail to embodiments of the invention, examples of which are illustrated in the accompanying drawings. While the invention will be described in conjunction with several embodiments, it will be understood that they are not intended to limit the invention to those embodiments. On the contrary, the invention is intended to cover alternatives, modifications and equivalents, which may be included within the spirit and scope of the invention as defined by the appended claims.

One embodiment of the present invention provides innovative operating system techniques for network processing designed and implemented for network processors. In many conventional implementations, network processors are multiprocessor system-on-chip components optimized for packet input-output and modification. Network processors typically include a tightly coupled multiprocessor architecture. Advantageously, the present invention is capable of enhancing packet throughput and minimizing latency through the use of novel software techniques for common operating system functions, according to an embodiment of the present invention.

Several of the inventive systems, methods, and computer program products for processing reflective state machines may be implemented for use with network processor (NP) platforms, such as for example in a Teja Network Processor platform. References to "Teja" are references to particular embodiments, computer programming code segments, or other references to subject matter developed by Teja Technologies of San Jose, Calif.

Figure 1:
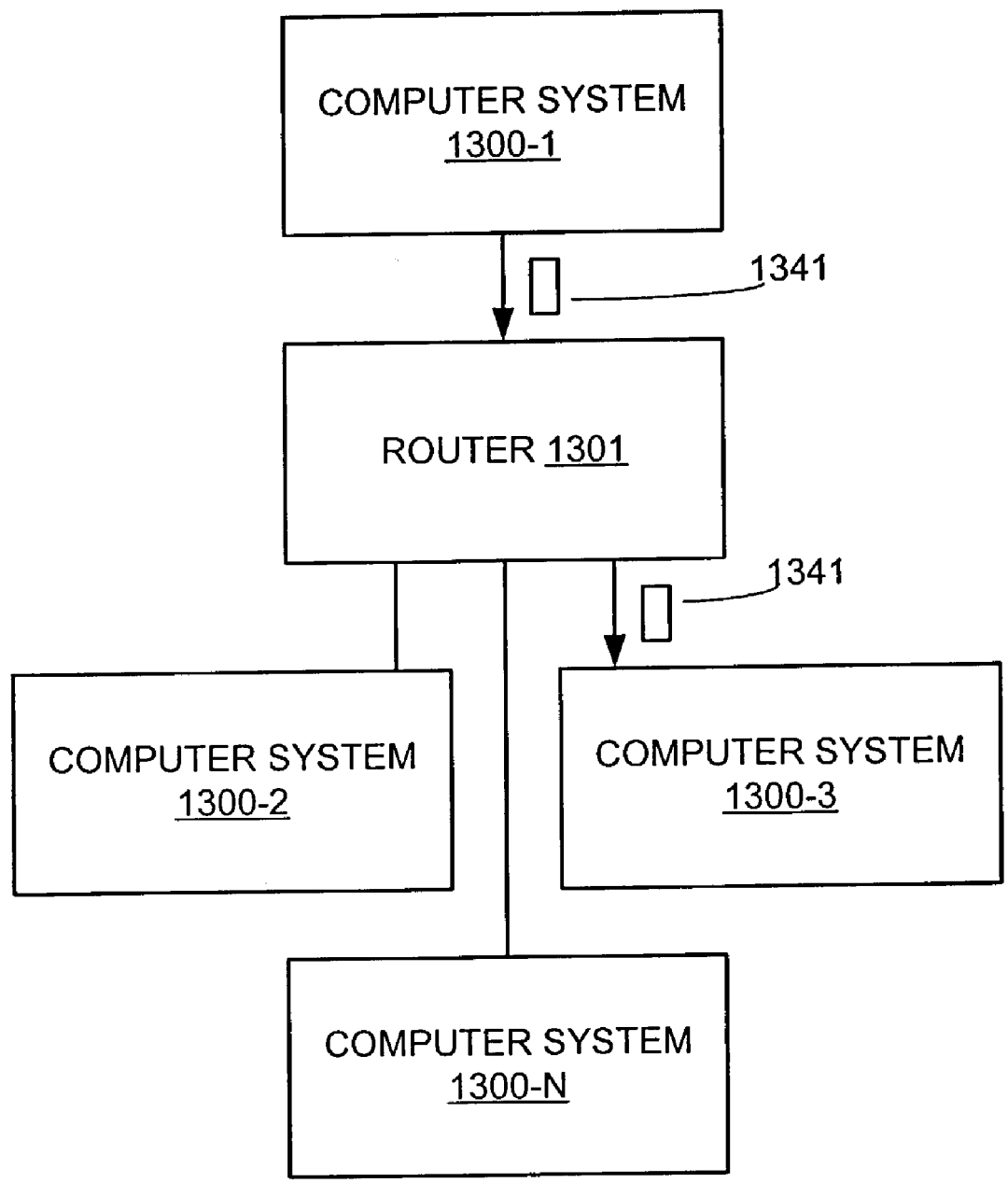
FIG. 1 generally depicts a router receiving and forwarding a packet, according to the prior art.

Turning now to the drawings, wherein like components are designated by like reference numerals throughout the various figures, attention is directed to FIG. 1 illustrating a conventional router 1301 coupled between multiple computer systems 1300-$x$ (for example, computer systems 1300-1, 1300-2, 1300-3, . . . , 1300-N) according to the prior art. Communication between multiple computers systems 1300-$x$ may use the router 1301 to route a packet of information 1341, or more simply a packet 1341, between computer systems. As depicted, computer system 1300-1 may send a packet 1341 to the computer system 1300-3 through the router 1301. The router 1301 typically receives the packet 1341, analyzes the packet to determine where to forward the packet, and then, as illustrated, forwards the packet to the destination computer system 1300-3.

Figure 2:
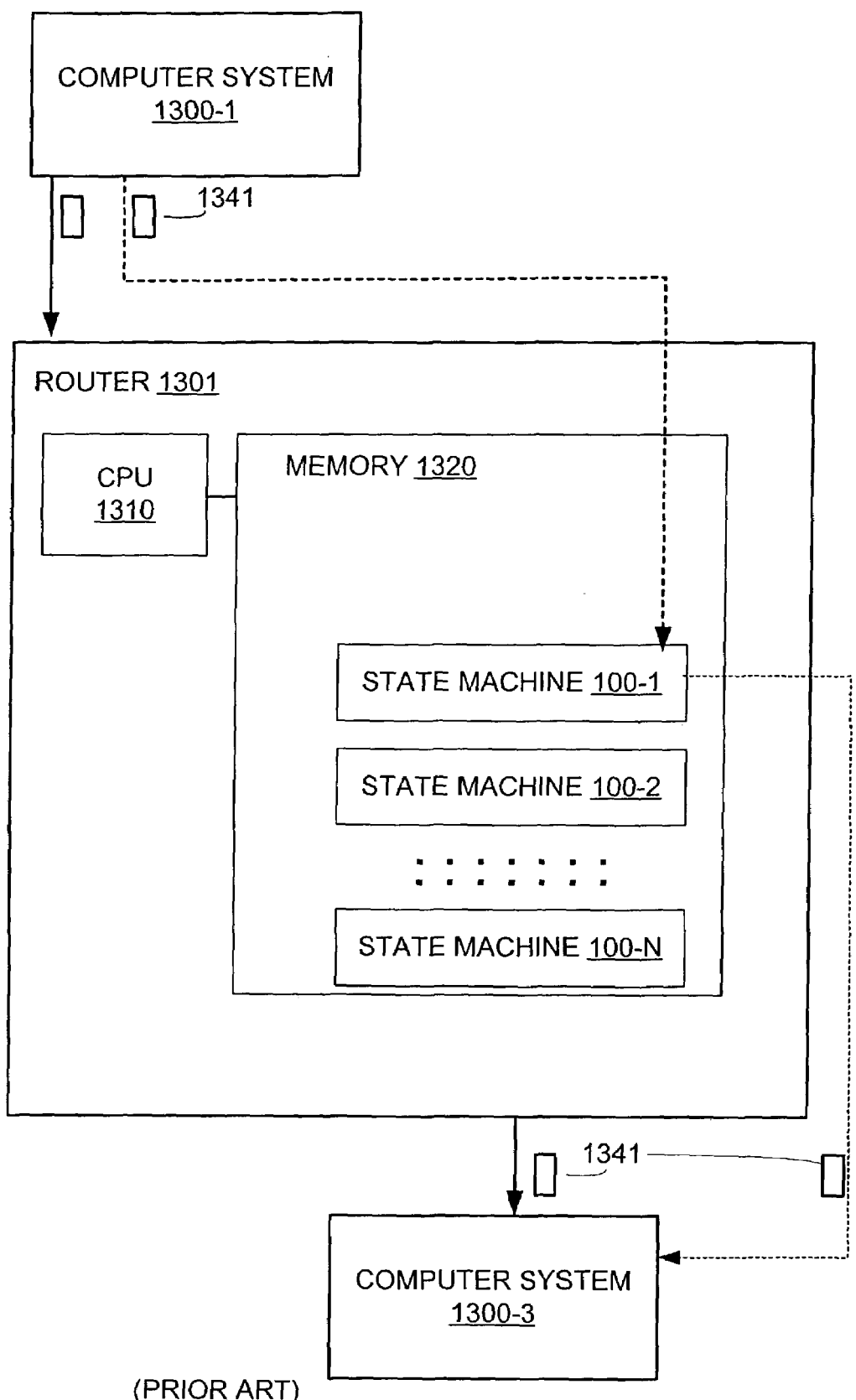
FIG. 2 generally depicts a router including a CPU and memory for receiving and forwarding a packet, according to the prior art.

As illustrated in FIG. 2, the conventional router 1301 may include a CPU 1310 coupled with memory 1320. The memory 1320 may be coupled with at least one state machine 100-$x$ (for example, state machine 100-1, 100-2, . . . , 100-N). Each of the state machines 100-$x$ may include instructions for performing a particular function, such as for example a function for receiving packet 1341, determining the destination address of the received packet 1341, and forwarding the packet 1341 to the determined destination address. The CPU 1310 may execute instructions associated with each of the state machines 100-$x$ sequentially according to a predefined ordering, through the use of context switching. The context switching is a time-consuming operation typically performed when the CPU 1310 stops executing one thread (for example, state machine 100-1) and begins executing a second thread (for example, state machine 100-2). Unfortunately, the context switching within a conventional router 1301 does not take into consideration the attributes corresponding with a given state machine 100-N. Consequently, processing of state machines such as state machine 100-N is not performed efficiently.

Figure 3:
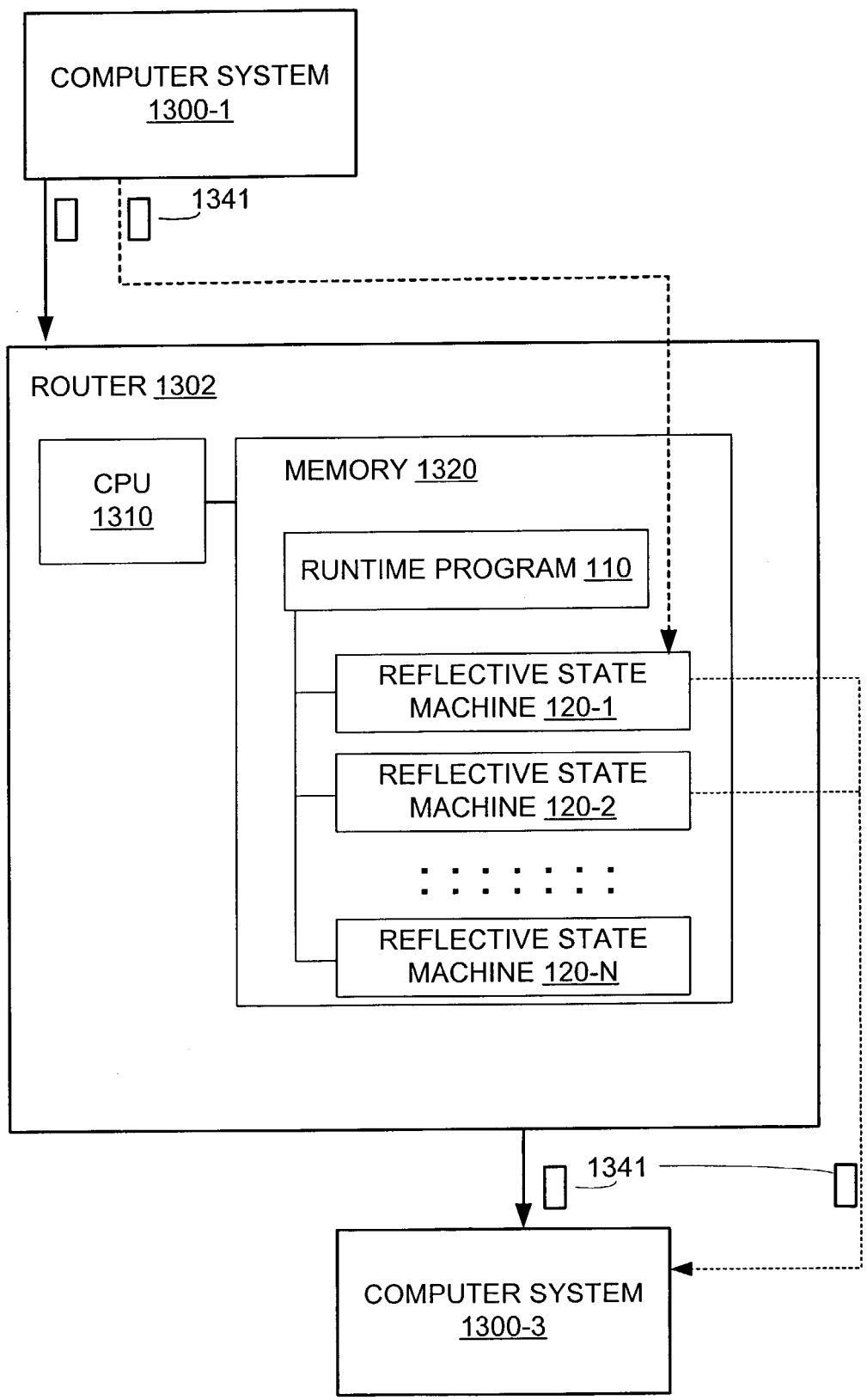
FIG. 3 generally depicts a router including a CPU and memory for receiving and forwarding a packet, according to an embodiment of the present invention.

Advantageously, the present invention can enhance performance by limiting the number of context switches and thereby provide a more efficient utilization of resources. FIG. 3 illustrates an innovative router, generally designated 1302. The innovative router 1302 typically includes a run-time program 110 coupled with at least one reflective state machine 120-$x$. The run-time program 110 may be used to interact with a number of reflective state machines 120-$x$. Correspondingly, an embodiment of the present invention advantageously extends and improves upon the conventional art by using reflective state machines 120-x and a run-time program 110 to limit context switching and improve performance of a processor, such as for example one or more network processors. According to one embodiment, the term reflective provides a means of inspecting one or more attribute at run-time. An attribute may include, without limitation, name, number of states, and/or a variety of other potential attributes that will be appreciated by one skilled in the art.

Figure 4:
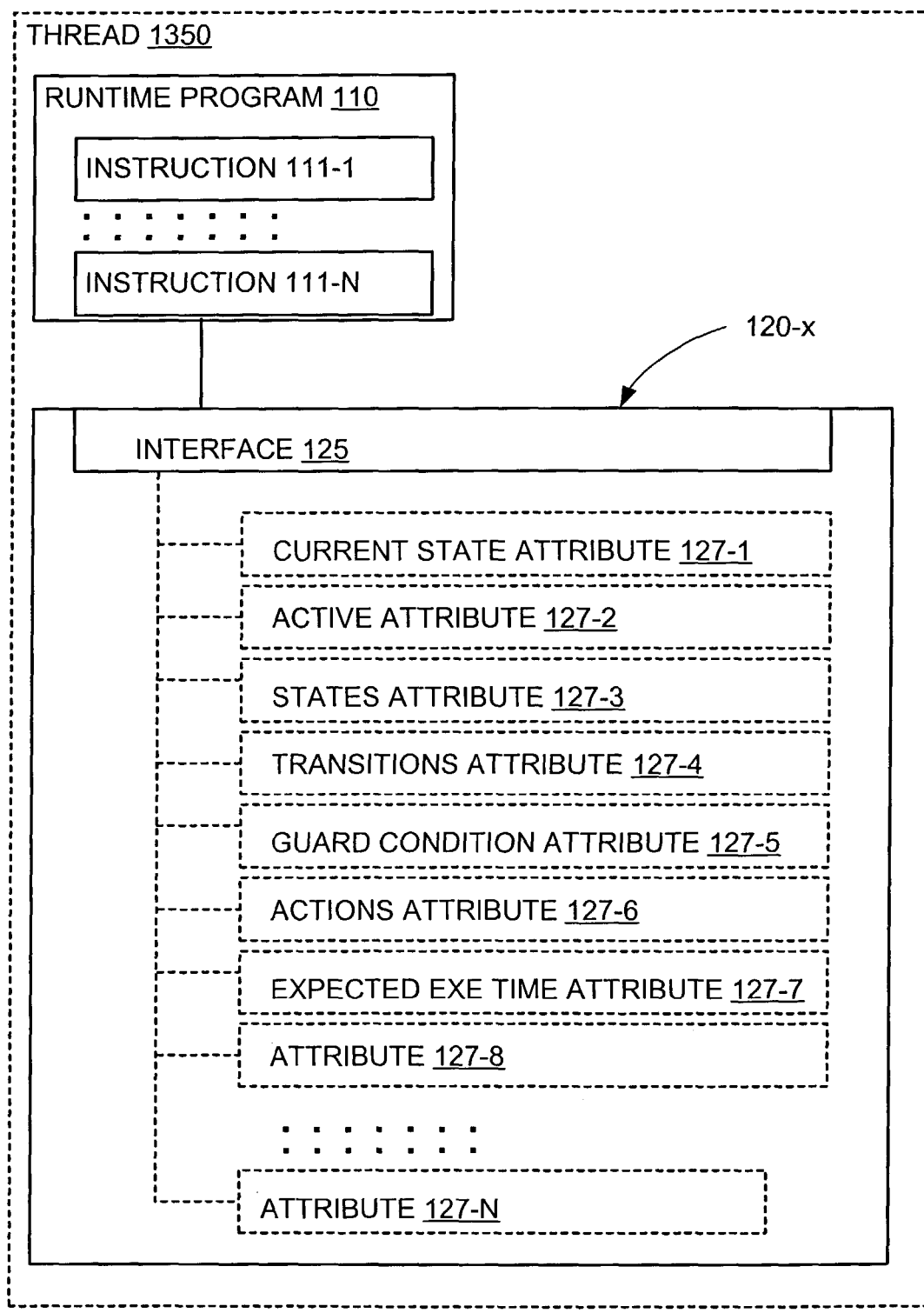
FIG. 4 generally depicts a reflective state machine, according to an embodiment of the present invention.

As illustrated in FIG. 4, a reflective state machine 120-x builds on the concept of the state machine 50-x with the inclusion of an interface 125 that allows access to certain attributes of a state machine. According to one embodiment, the current state attribute 127-1 may be available to a program, such as for example the run-time program 110, through the interface 125. Correspondingly a run-time program 110 may utilize the interface 125 to determine the current state 127-1 of the reflective state machine 120-x. The determined current state attribute can be used in determining a processing order of this and other reflective state machines. A variety of other attributes 127-x may also be available through the interface 125.

Using the interface 125 a state machine may advantageously be implemented as reflective state machines. Correspondingly, a program such as the run-time program 110 may be coupled with one or more reflective state machines 120-x to optimize the execution of an individual reflective state machine 120-x and/or the group of reflective state machines. According to one embodiment, the run-time program 110 may utilize the interface 125 to access attributes associated with one or more reflective state machine 120-x to determine the scheduling the execution of reflective state machines 120-x. Alternatively the run-time program 110 may utilize the interface 125 for inspection, scheduling, and/or execution of reflective state machines 120-x.

Figure 5:
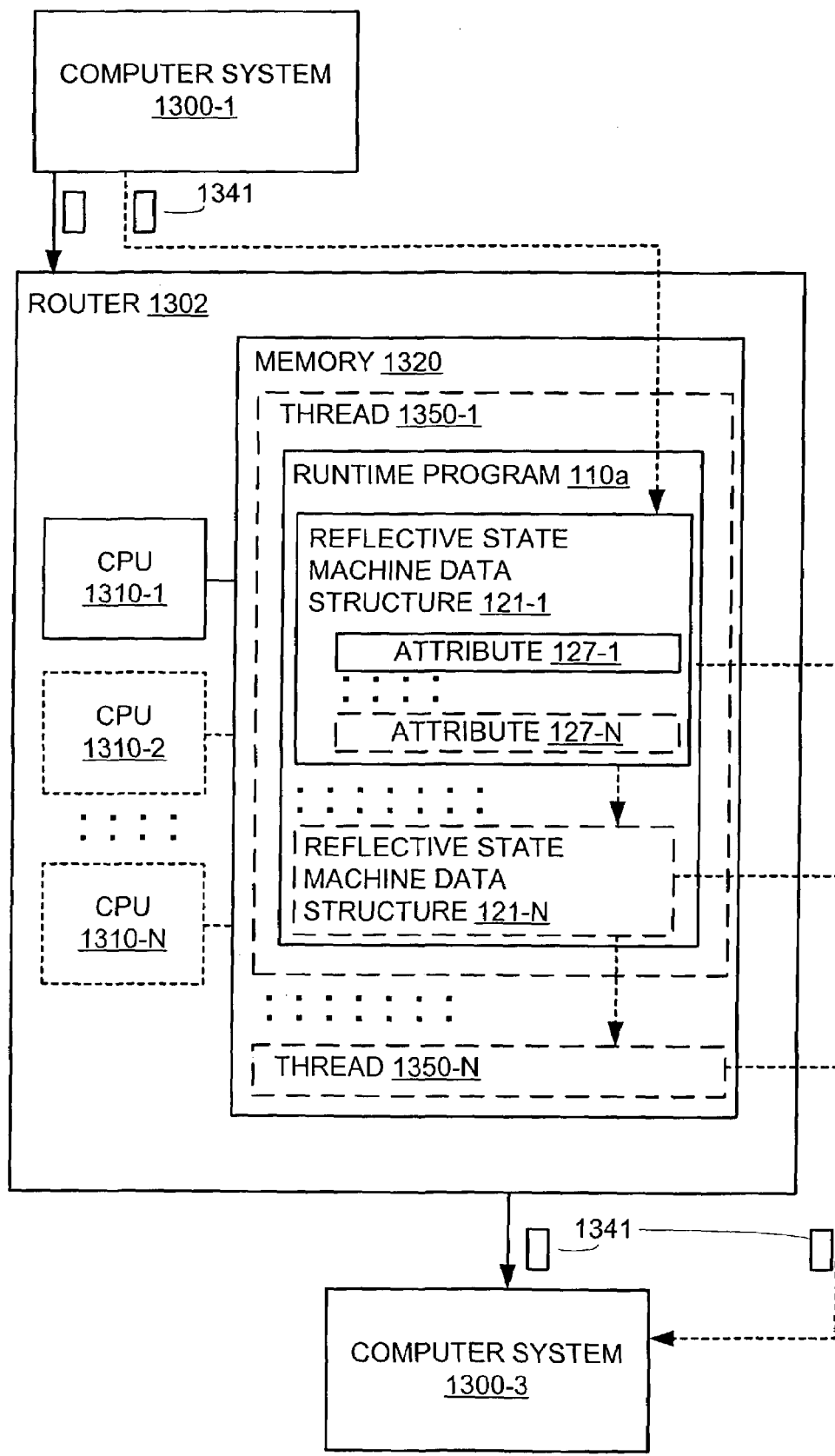
FIG. 5 generally depicts a router including a CPU, memory, reflective state machine data structures, according to an embodiment of the present invention.

As illustrated in FIG. 5, a reflective state machine 120-x may advantageously be encoded into a reflective data structure 301-x for use by a run-time program 110a. Here, a reflective data structure 301-x can provide a way of storing attributes 127-x corresponding to the attributes 127-x of a reflective state machine 120-x. Correspondingly, those attributes coupled with the interface 125 may still be available to other programs, such as for example the run-time program 110a. The run-time program 110a may thereby support scheduling, inspection, and execution of functionality corresponding to at least one reflective state machine 120-x that is encoded in a reflective state machine data structure 301-x. A variety of generic techniques for storing and making the reflective state machine attributes available are know in the art, and therefore are not described in greater detail herein.

As defined herein, references corresponding to a reflective state machine (such as for example, reflective state machine 120-x) may also apply to reflective state machine data structure. Correspondingly, reference to a reflective state machine data structure (such as for example, data structure 301-x) may also apply to reflective state machines. Further, a variety of other implementations may be utilized to provide similar functionality.

According to one embodiment, a single program, such as for example the run-time program 110a, may be coupled with multiple reflective state machine data structures, such as for example 301-1, . . . , 301-N. The run-time program 110a may thereby inspect, schedule, and/or execute multiple reflective state machines 120-x corresponding to the reflective state machine data structures 301-x. Advantageously, the multiple reflective state machines 120-x may be executed within a single thread 1350-1 corresponding with the run-time program 110a. Advantageously, the execution of the reflective state machines 120-x can be performed with minimal context switching overhead. Preferably, the functionality of each reflective state machine 120-x may be performed within the context of a single thread 1350. The reflective state machine 120-x may be used to reduce unnecessary processing associated with conventional context switching. According to another embodiment a program 110a may schedule the execution of multiple state machines (for example, state machines 301-1, . . . , 301-N) with different computer threads, such as for example, 1310-1, . . . , 1310-N. Advantageously, the present invention can reduce the context switching time associated with processing state machines 50-x. The interface 125 can be used to interact with a number of reflective state machines 120-x.

Advantageously, the current state and/or other attributes 127-x associated with each reflective state machine, may be taken into consideration in determining an order for processing each state machine. According to one embodiment, the processing order may change dynamically, for example based in part on the attributes of each state machine that are accessible through the interface.

A reflective state machine enables an application-independent runtime scheduling system, such as for example the run-time program 110a, to access application-specific state machine information. In part, a number of reflective state machines 120-x may include a standardized interface to allow a program, such as for example the run-time program 110a, to be coupled with one reflective state machine 120-x through the corresponding interface 125. Advantageously, each interface 125 may provide similar functionality to support inspection, scheduling, and/or execution of the reflective state machine.

A reflective state machine 120-x can be embodied in a computer thread 1350-1 running on a computer processor 1310-1. In addition, the reflective state machine may be defined using a table (not shown). The supporting tables may be used in conjunction with the computer thread and/or run-time program to provide the functionality of the reflective state machine. A high level description of a reflective state machine may also be translated into a set of tables that describe the state machine, and/or a set of state machines. These tables may be used to enable the reflective functionality of the state machine.

Figure 6:
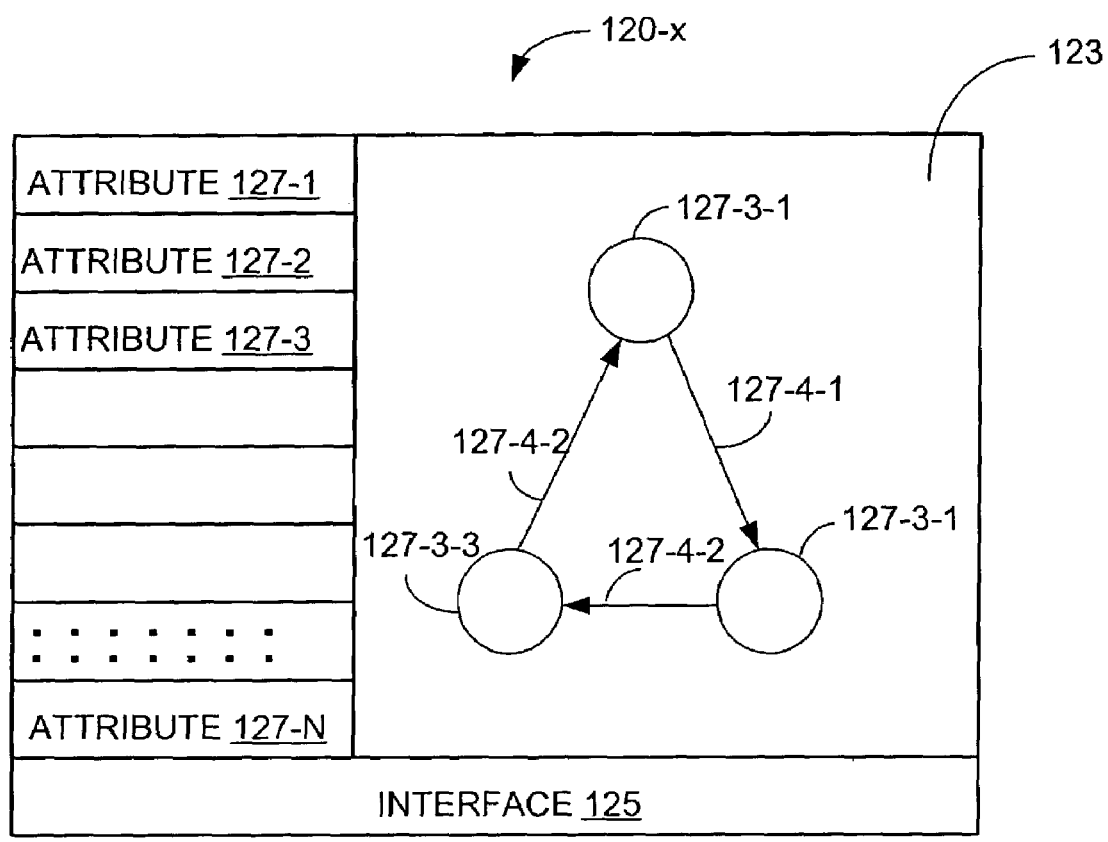
FIG. 6 generally depicts a state transition diagram representing an embodiment of a state machine, according to an embodiment of the present invention.

FIG. 6 depicts an embodiment of a reflective state machine 120-x, including an interface 125, attributes 127-x, and a state transition diagram 123. The state transition diagram 123 illustrates a number of states 127-3-x (for example, states 127-3-1, 127-3-2, 127-3-3) and transitions 127-4-x (for example, transitions 127-4-1, 127-4-2, 127-4-3). Attributes of the reflective state machine 120-x and/or the state transition diagram 123 may correspond with the interface 125. Attributes 127-x typically described the reflective state machine 120-x and may include current state, variables, functions, procedures, constructors, destructors, states, guards, transitions, as well as other attributes. According to one embodiment, the attributes 127-1, . . . , 127-N may be sufficient to define the state machine without requiring a state transition diagram. The state transition diagram 123 may provide a useful graphical depiction to facilitate a users understanding of a state machine.

Figure 7:
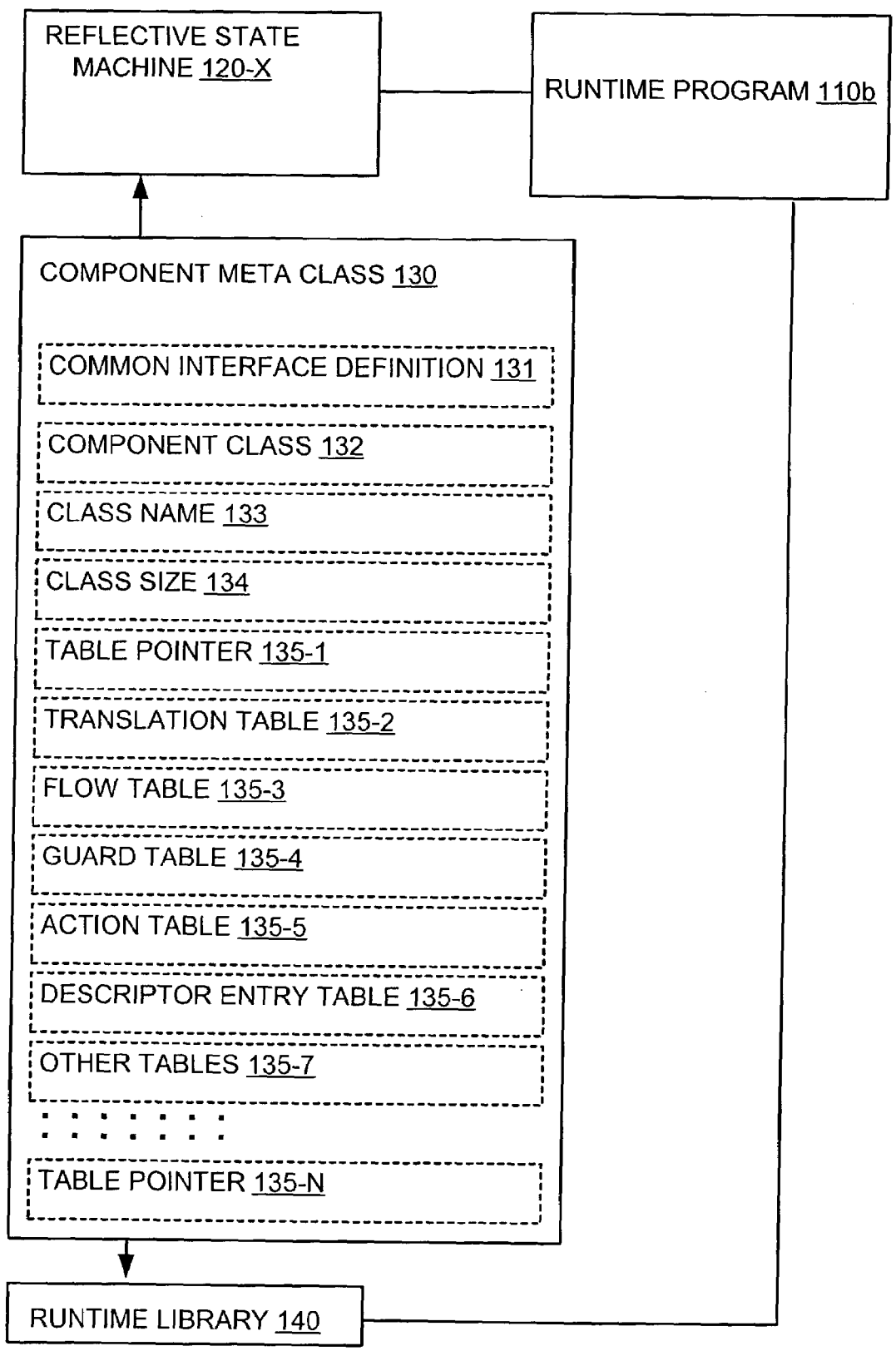
FIG. 7 generally depicts an embodiment of an approach to creating a computer program capable of executing at least one state machine, according to an embodiment of the present invention.

FIG. 7 illustrates an object-oriented implementation for coupling reflective state machines 120-x with a runtime program 110b. In this exemplary implementation, a component meta class 130 is used by both the reflective state machines 120-*x* and the run-time library 340. The run-time program 110*b* is coupled with both reflective state machine 120-*x* and the run-time library 340. Consequently, the run-time program 110*b* can interact with one or more reflective state machines 120-*x* based in part on the component meta class 130.

According to one embodiment, the component meta class 130 may be represented as a data structure associated with a component class to describe common attributes of one or more component classes to allow a runtime system to inspect any class instance (of the component class) at runtime. For example, without limitation, the runtime system may determine how many states and/or functions correspond with a class instance while the class instance is being processed in a runtime environment.

A component meta class may for example, be defined in the Unified Modeling Language (UML), and may be used to identify things and how these things can be functionally coupled together. According to one embodiment of the present invention, the things may correspond with the reflective state machine interface 125, which can be coupled into a scheduling program or other computer program, such as for example the run-time program 110*b*, to facilitate interacting with one or more reflective state machines 120-*x*.

The component meta class 130 may also be used by the runtime program 110*b* or a runtime library 340 to support interacting with the interface 125 of the reflective state machine 120-*x*, such as for example, state, transitions, actions, and guard conditions. The component meta class 130 may be linked or coupled with the reflective state machine 120 to provide an interface to the reflective state machine. The interface 125 may be used during execution of the runtime program 110*b* to interact with, determine execution order, and/or to execute the state machine 120-*x*. The runtime library 340 may also be used during execution of the runtime program 110 to interact with, determine execution order, and/or to execute the state machine 120-*x*.

In one scenario, the runtime program 110*b* uses the component meta class 130 to execute a state machine 120 by determining the current state, potential transitions, guard conditions, and performing a transition or other function. One implementation includes the use of function pointers which are well known and provide an ability to uniquely identify the computer program functions. Function pointers may be used by the runtime library 340 and/or the runtime program 110*b* to access the component meta class 130 coupled with a reflective state machine 120-*x*, and to access attributes 127-1, . . . , 127-N of the state machine 120. The function pointer may be a function pointer variable that identifies a function associated with a reflective state machine. The function pointer variable may provide the ability to execute functions coupled with the state machine 120.

This approach can allow an application-independent program such as a run-time program 110*b*, computer program, and/or system (for example, the Teja runtime system) to interact with one or more state machines based in part on the interface provided by the component meta class 130. The component meta class 130 may thereby enable an application-independent runtime scheduling system to access and execute application-specific state machines.

According to one embodiment, a component meta class 130 may define a number of attributes that are typically inherited by a corresponding reflective state machine 120-*x*. Several example attributes that may be defined in a component meta class 130 include: class name 133, class size 134, and a number of table pointers 135-*x*. The table pointers 135-*x* may include pointers for a table pointer 135-1, transition table 135-2, flow table 135-3, guard table 135-4, action table 135-5, descriptor entry table 135-6, and any other tables 135-N that may be utilized with a reflective state machine 120-*x*.

One exemplary embodiment of a component meta class 130, may be provided by and/or include a component class 132. An example component class 132 is the Teja component class 132*a* illustrated below in Table 1 by way of illustration and not by way of limitation. In this definition structure, a standardized interface for interacting with the reflective state machine 120-*x* is supported through the component class definition 132 to provide a standardized interface and thereby support interaction with a variety reflective state machines 120-*x*, runtime program 110, and the run-time library 340. Interaction with the reflective state machine 120-*x* may also be allowed by variety of other classes and/or objects coupled with the component meta class 130.

A specific example of a component meta class 130 is provided with the component class named TejaComponentClass. This component class illustrates information that would correspond with each reflective state machine 120-X that is based on the component meta class 130. Pseudocode for one particular embodiment of a Teja based component class is located below in Table 2 by way of illustration and not by way of limitation.

Figure 8:
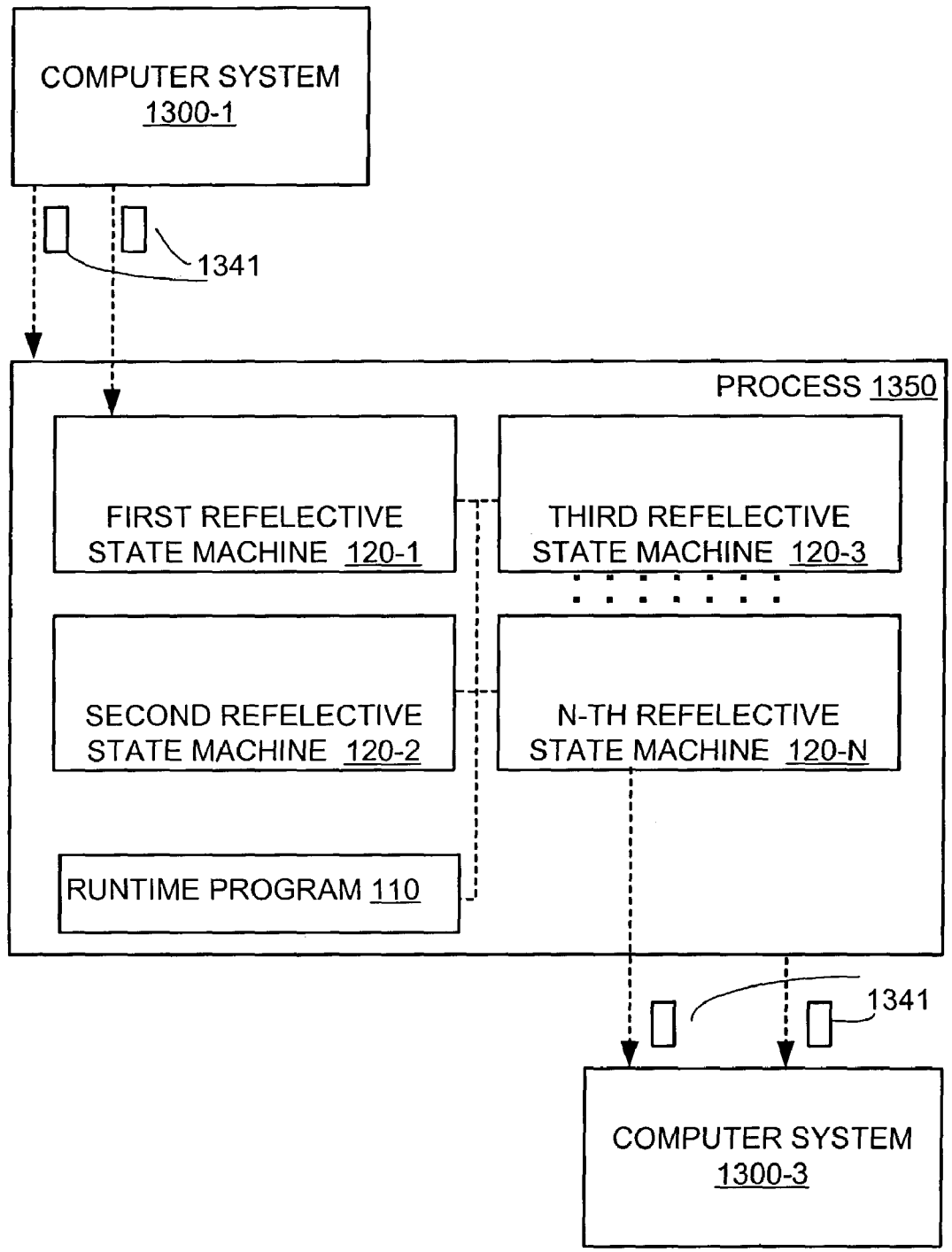
FIG. 8 generally depicts a single thread executing a run-time program and multiple reflective state machines, according to an embodiment of the present invention.

FIG. 8 illustrates an exemplary runtime system 132 executing in conjunction with a single thread, such as for example 1350, while giving the appearance of concurrent execution of a number of individual state machines 120-1, 120-2, 120-3, . . . , 120-N. The runtime program 110 can iterate through the reflective state machines 120-*x* (for example, any reflective state machine 120-1 through 120-N) sequentially, according to an algorithm, and/or according to another pattern, which may be selected or determined. The execution order may for example be determined based in part on the attributes of individual reflective state machines. Further, the current value of attributes may be used to determine subsequent scheduling of an individual reflective state machine. Execution of a state machine 120-*x* may be similar to the description above relative to the FIGS. 3 through 5.

In one example, the runtime program 110 executes the first state machine 120-1 by determining the current state, possible transitions and guard condition and then making a transition, if possible, with the execution of any associated function. A number of possible transitions may be analyzed based on the attributes coupled with the reflective state machine. The runtime program 110 may execute a transition or function coupled with the reflective state machine. If no transition or function can be executed then the runtime program may analyze or execute another state machine, such as 120-2.

TABLE 1

Example Component Meta Class Pseudocode

```
typedef struct TejaComponentClass
{
    TEJA_CONST int classId;
#ifndef TEJA_CPP
    TEJA_CONST TejaComponentVT *virtualTable;
#endif /* TEJA_CPP */
    TEJA_CONST char *className;
    TEJA_CONST TejaDestructorFn destructor;
    TEJA_CONST char type;
    TEJA_U_INT32 size;
```

TABLE 1-continued

Example Component Meta Class Pseudocode

```
#ifndef TEJA_EMBEDDED
    TEJA_CONST int nDescEntries;
    TEJA_CONST TejaAuxDescriptorEntry * *descEntries;
/* End of TejaAuxClass */
    TEJA_CONST char **dsnames;
    TEJA_CONST char **csnames;
#endif/* TEJA_EMBEDDED */
    TEJA_CONST int nDiscreteStates;
    TEJA_CONST int nContinuousStates;
    TEJA_CONST int nTransitions;
    TEJA_CONST int nProactions;
    TEJA_CONST int nOutputEvents;
    TEJA_CONST int *transient; /* boolean array, same size as
    dsnames */
    TEJA_CONST TejaFlowFn *flows;
    TEJA_CONST TejaGuardFn *guards;
    TEJA_CONST TejaActionFn *actions;
    TEJA_CONST TejaTransition *transitions;
    TEJA_CONST int **proactions; /* proactions (indexing
    transitions) */
    TEJA_CONST int **reactions; /* reactions (indexing transitions) */
    TEJA_CONST int **responses; /* responses (indexing transitions) */
    TEJA_CONST int * outputEvents;/* output events (same idx as
    dependents)*/
}
TejaComponentClass;
```

Figure 9:
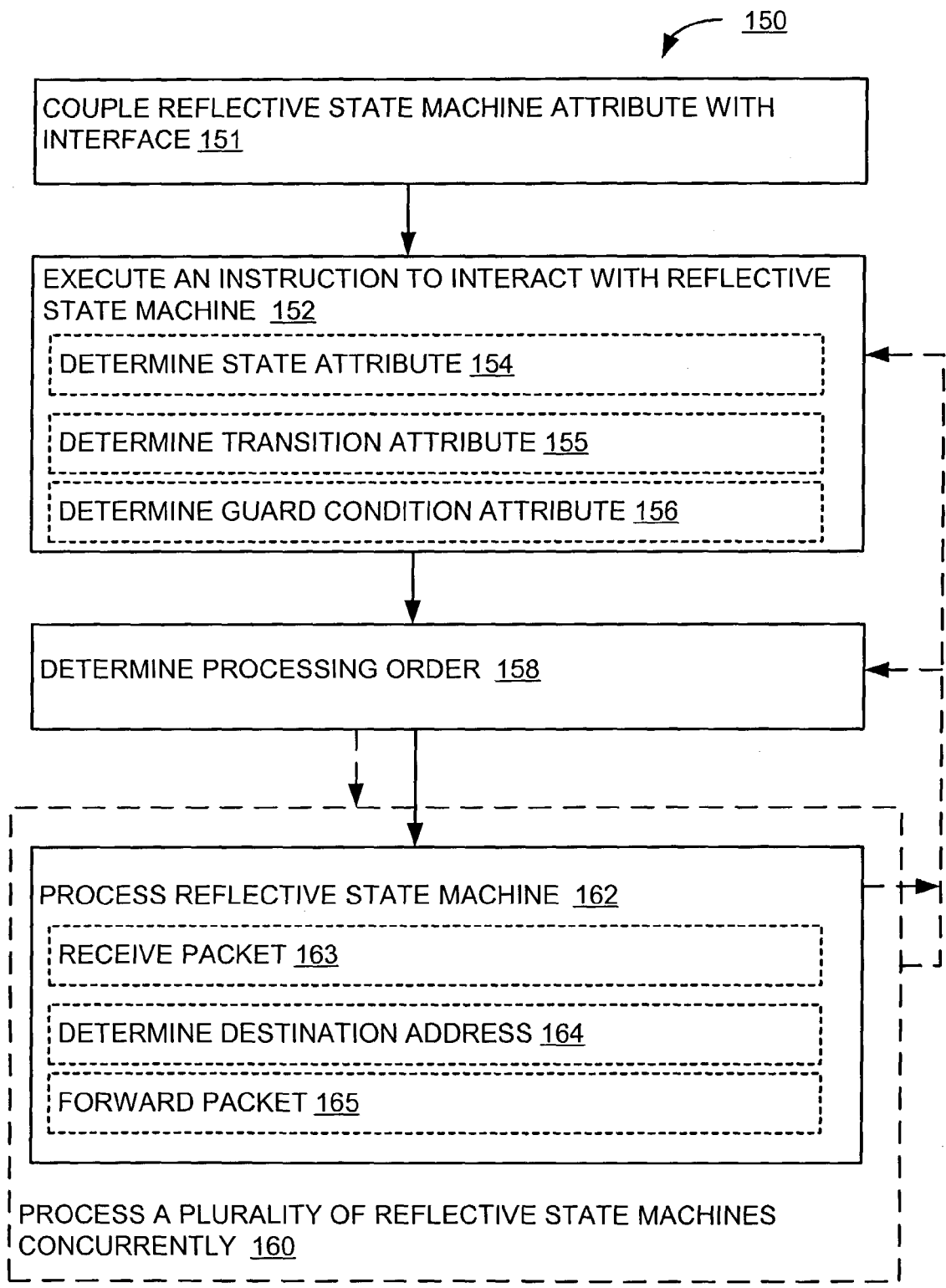
FIG. 9 illustrates a method for processing a reflective state machine, according to an embodiment of the present invention.

FIG. 9 illustrates an exemplary method 150 for processing reflective state machines according to one embodiment of the present invention. Initially, one or more attributes 127-x corresponding to a reflective state machine 120-x may be coupled with an interface 125 at 151. One or more instructions 351-x may be executed to interact with one or more reflective state machines 120-x at 153. The instructions 351-x may be used to determine attributes 127-x corresponding to a reflective state machine 120-x, such as for example, determining the state attribute at 154, the transition attribute at 155, and/or the guard condition attribute at 156. A processing order may be determined at 158 using the attribute information determined at 153. The reflective state machine may be processed at 162 as described herein. According to one embodiment, the processing may include a number of processing activities including receiving a packet at 163, determining a destination address at 164, and/or forwarding a packet at 165. In one embodiment only one processing activity is performed before returning to the executing at 153 or the determining processing order at 158. Optionally, more than one processing activity may be performed before returning to processing at 153 or at 158. A plurality of reflective state machines may be processed concurrently at 160, as described herein.

According to one embodiment the coupling at 151 is performed during compilation of the reflective state machine 120-x and the run-time program 110. The execution of the run-time program 110 within a thread may perform the processing at 153, at 158, at 162, and at 160.

A number of reflective state machines 120-x may be processed concurrently by using a computer program or runtime program 110. The computer program 110 may execute in a single computer thread 1350 that executes one reflective state machine 120-1 for a certain duration of time, and then executes a second state machine 120-2 for another duration of time. In one embodiment, a runtime program 110 may execute state machine(s) 120-x according to a schedule, such as periodically, aperiodically, other schedule, or a combination of these. Processing a first reflective state machine may process a number of transitions sequentially according to an algorithm. The algorithm may process a first transition 127-4-x associated with the first reflective state machine 120-1, then process a second transition associated with a different state machine, and then processing another transition that is again associated with the first reflective state machine 120-1. A variety of algorithms may be used to support concurrently processing a number of reflective state machines.

The runtime program 110 may execute a number of state machines according to the schedule, which may be used to simulate the concurrent execution of a number of state machines. Individual attributes or groups of attributes coupled with a state machines may be available through the interface 125 to support the execution of a runtime program 110 and the reflective state machine 120-x. The interface 125 may provide access to a number of state machine attributes 127-x, such as for example current state 127-1, states 127-3 transitions 127-4, guard conditions 127-5, actions 127-6, and expected execution times 127-7 required to complete specific functions. A run-time program 110 may also include the ability to interact with one or more reflective state machines 120-x using a corresponding interface 125.

A processing order for processing the reflective state machines 120-x may be dynamically determined. For example, this dynamic determination may be based on one or more of a variety of factors including for example any one or combination of: (i) system requirements related to a group of reflective state machines 120-x, (ii) processing requirements of one or more reflective state machines 120-x and/or groups of reflective state machines 120-x, (iii) relative importance of a given reflective state machine in comparison to other reflective state machines, (iv) or other factors. The processing order may also be based on the attributes coupled with each state machine which are available through the interface to the state machine. The processing order of a plurality of state machine may alternatively be determined in part by schedule and in part by dynamic determination.

The runtime program 110 may execute a reflective state machine 120-x by using the interface 125 to the reflective state machine. As discussed above, the runtime program 110 may access attributes and perform functions associated with the state machine. The execution may be performed based on the processing order and/or schedule.

An exemplary implementation of an application using the runtime library may for example involve processing network packets 1341. Processing packets (as illustrated for example, in FIG. 3) can benefit from an efficient analysis of packets coming into a system so that they can be processed within a certain amount of time. A variety of protocols have been defined for passing packets 1341 between computer systems or other network nodes or components. One of the most common protocols is a so called "TCP/IP" protocol, which does not guarantee a packet 1341 will actually be delivered to a destination computer system 1300-3. If the processing of packets 1341 is not performed efficiently by the router 1301 or 1302 then a number of packets may be lost because numerous packets may be continually received by the router without regard to processing efficiency. If more packets are received than can be processed over a given duration then unprocessed packets are typically lost. Consequently, having a run-time program 110 which can execute a number of reflective state machines efficiently would advantageously result in better performance and fewer lost packets 1341.

According to one embodiment, a run-time program 110 may execute individual state machines, determine the execution order, and may also perform dynamic scheduling. Alternatively, the execution order and the schedule may be predetermined.

The particular state machines being executed by a runtime program may be identified by a predetermined list. The list may be used in determining an execution sequence and/or executing the state machines. Alternatively, the list may be dynamic such that for example, it may reflect changes in the identity, number, or activity of state machines. Changes in processing resources available to the runtime program may also be reflected in such a list.

An alternative embodiment of the invention provides that the method and computer program increments through one or more associated state machines to determine the current state, determine any guard conditions, and perform a single transition if permitted. A transition is permitted, for example, when the reflective state machine can perform the transition. A transition would not be permitted, for example, if the reflective state machine was blocked, such as while the state machine is waiting for a packet to process. Accordingly, each state machine may perform a transition and/or action, depending on guard conditions associated with the state machine. In a preferred embodiment one transition and/or action is performed for each state machine that is in a ready state. A computer program or run-time program 110 may use the interface 125 to determine specific attributes of the reflective state machines and to determine which reflective state machines are in a ready state and/or when they are anticipated to enter a ready state. According to one embodiment of the present invention, the computer program and/or method sequential repeats through the state machines that are in a ready state and/or are anticipated to be in a ready state to make efficient use of the processing resources. According to another embodiment of the present invention, the computer program and/or method uses an algorithm support the efficient use of the processing resources. Processing the state machines sequential also provides an appearance that a number of state machines may be executing concurrently.

In one embodiment, a router 1302 is capable of processing a packet 1341 using a plurality of processors, such as for example CPU 1310-1, . . . , 1310-N of FIG. 5. Each processor 1310-$x$ may be capable of executing at least one thread 1350-1, . . . , 1350-$x$. A first thread 1350 may be capable of executing a first program 110 including at least one first program instruction 351. The first program 110 may include a method of processing a packet 1341 using at least one state machine 120-$x$. At least one attribute 127-$x$ of the reflective state machine 120 may be coupled with an interface 125. In one embodiment, the attribute 127-$x$ may be selected from a group of attributes consisting of: a state attribute 127-1, a transitions attribute 127-4, a guard condition attribute 127-5, and combinations thereof. Other embodiments may utilize different attributes 127-$x$. At least one instruction 351 may for example, be executed which is capable of interacting with the reflective state machine 120-$x$ using the interface 125. The reflective state machine 120-$x$ may execute as an independent thread 1350-$x$ in communication with the first thread 1350 and/or the first program 110.

An order may be determined for processing the reflective state machines. Each state machine may be processed based on the interface and the order of execution. At least one attribute may be used in determining the processing order. At least one state machine may be used for processing packets.

In one embodiment, a single computer thread running on a single CPU may be used to execute processing associated with a plurality of state machines. Alternatively, multiple computer threads, coupled with a single CPU, may be scheduled for execution. A variety of approaches for scheduling the execution of multiple threads using a single processor may be utilized. The order of execution may be predetermined. The order of execution may be based on attributes available through the interface to the state machine. Alternatively, attribute information may be used to determine future scheduling of a given state machine. For example, a state machine may be blocked when waiting for a packet to be processed. If a state machine is currently blocked then the subsequent scheduling of this state machine for execution may be delayed to provide sufficient time for the blocked condition to be eliminated.

In another embodiment, a single thread may execute multiple state machines concurrently, determining the current state, determining any guard conditions and preferably performing one or more transitions. Attributes of the state machines may be used by the runtime program to determine a processing order of the state machines.

According to another embodiment, a state machine processing system may include at least one state machine with an interface to access at least one attribute of the state machine. At least one instruction may be capable of interacting with the state machine using the interface. An order for processing at least one state machine may be determined dynamically and/or predetermined. A computer program may be coupled with the at least one instruction and the processing order to execute the at least one state machine. The computer program may use a single thread, or may use multiple threads.

Processing reflective state machines 120-$x$ and reflective state machine data structures 301-$x$ using a run-time program 110 may also be very useful in a variety of other areas such as for example: scheduling, data logging, and serialization. Each of which will be described in turn.

A run-time program 110 may perform a scheduling function including the evaluation of specific attributes 127-$x$ of at least one reflective state machine 120-$x$, such as for example evaluating the current state, transitions, and guard conditions, to schedule the executing of the reflective state machines 120-$x$. Scheduling may obtain a variety of information through the interface 125 that may be used in a scheduling function. According to an exemplary embodiment, the interface may be used to determine the processing requirements of a reflective state machine 120-$x$. The determination may be made based on whether the current state (for example, current state 127-1) is in a transient state or if the state is currently waiting for some external processing to complete, such as for example identifying the destination address.

A run-time program 10 may also perform data logging, which may include using the interface 125 to evaluate a class structure corresponding to a reflective state machine 120-$x$, including the names of discrete states 127-3, variables 127-4, and other attributes 127-N that may be stored in a data log. In one embodiment the run-time program 110 accesses information from a reflective state machine 120-$x$ through the corresponding interface 125, and stores the information into a data log.

A run-time program 110 may also perform serialization of reflective state machines. Serialization provides a way of storing an object such as a reflective state machine 120-$x$. According to one embodiment, the serialization of a reflective state machine 120-$x$ generates an ASCII representation of the reflective state machine 120-$x$ including the corresponding attribute, such as for example, a class implementation, and specific attributes). According to one implementation the runtime system may serialize the reflective state machine 120-*x* through the use of a so-called "write-out" function, that may have been defined as part of the common interface definition 131 (see FIG. 7). As an example, each attribute (for example, a member variable) may be coupled with a read and a write function corresponding to the interface 125. Recall that one embodiment of a reflective state machine as illustrated in FIG. 7 is coupled with the component meta class 130.

Figure 10:
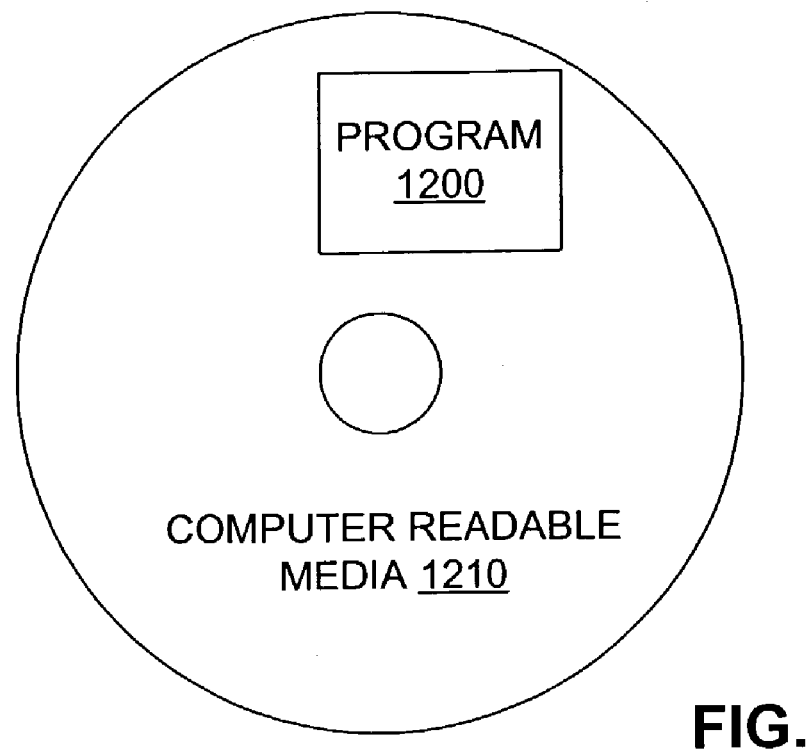
FIG. 10 depicts an embodiment of a method implemented on a computer readable media, according to an embodiment of the present invention.

FIG. 10 depicts an exemplary method according to the present invention on a computer readable media 1210. A computer program 1200 represents at least one of the methods described herein, such as for example a reflective state machine, a scheduler, and communication between a scheduler and at least one reflective state machine. The program 1200 is coupled with or stored in a computer readable media 1210, such that a computer system can read and execute the computer program 1200.

Figure 11:
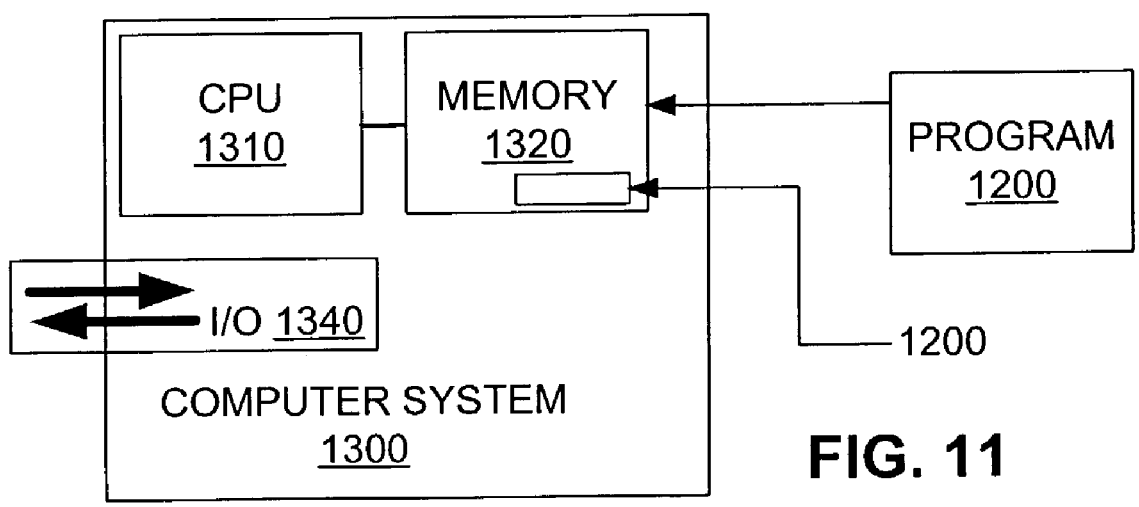
FIG. 11 depicts an embodiment of a method executed by a computer system, according to an embodiment of the present invention.

FIG. 11 depicts an exemplary computer system 1300 including at least one processor or central processing unit (CPU) 1310, a memory 1320 coupled to the CPU 1310, and support for input and output 1340. The computer program 1200 may be loaded into a memory 1320 accessible to the computer system 1300, which is capable of executing the program 1200. Alternatively, the program 1200 may be permanently embedded in the memory 1320. The support for input and output 1340 typically interacts with the program 1200.

In many respects the modifications of the various figures resemble those of preceding modifications and the same reference numerals followed by subscripts a, b, c, d, e, f, g, h, i and j designate corresponding parts.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the claims appended hereto and their equivalents.

What is claimed is:

1. A computer-implemented method of processing at least one state machine, said method including:
   (A) coupling at least two attributes with a state machine selected from said at least one state machine;
   (B) identifying at least one value corresponding with a first attribute selected from said at least two attributes;
   (C) determining a processing order based on said at least one value to process at least one second attribute selected from said at least two attributes; and
   (D) processing said second attribute according to said order at (C).

2. The method of claim 1, wherein said at least two attributes are selected from a group of attributes consisting of a state attribute, a transition attribute, a guard condition attribute, a variable attribute, a function attribute, pointer attribute, and combinations thereof.

3. The method of claim 1, wherein said identifying, said determining, and said processing is performed repetitively.

4. The method of claim 1, wherein said identifying, said determining, and said processing is performed repetitively without context switching.

5. The method of claim 1, wherein said determining said processing order at (C) is dynamically determined in conjunction with said identifying at (B).

6. The method of claim 1, wherein said processing order at (C) is predetermined.

7. The method of claim 1, wherein said processing order at (C) is based on a predetermined list identifying said at least one state machine.

8. The method of claim 1, wherein said processing at (D) is used to process computer network packets.

9. The method of claim 1, wherein said coupling at (A) includes coupling said state machine with a runtime library usable by said processing at (D).

10. The method of claim 1, wherein said at least one state machine includes a plurality of state machines, and said determining a processing order further comprises determining a processing order based on said at least one value corresponding to each of said plurality of state machines.

11. The method of claim 10, wherein said at least one second attribute is selected from said at least two attributes corresponding with said plurality of state machines.

12. The method of claim 10, wherein said processing at (D) further includes:
   storing at least two attributes coupled at (A); and
   incrementing through said plurality of state machines based on the stored attribute.

13. The method of claim 1, wherein said attribute at (A) further comprises a state attribute with a corresponding value selected from a group of state attributes consisting of: a ready state and a blocked state.

14. The method of claim 13, wherein said determining at (C) is based on said state attribute.

15. A computer-implemented state machine processing system to execute at least one state machine, including a state machine computer program, the system comprising:
   a storage structure including a first memory;
   an attribute manager, coupled with said storage structure and said state machine computer program, to couple at least two attributes with a state machine selected from said at least one state machine;
   an identification manger, coupled with said storage structure and said state machine computer program, to identify at least one value corresponding with a first attribute selected from said at least two attributes;
   an order manager, coupled with said storage structure and said state machine computer program, to determine a processing order based on said at least one value to process at least one second attribute selected from said at least two attributes;
   a processing manager, coupled with said storage structure and said state machine computer program, to process said second attribute according to said order; and
   a processor, coupled with said attribute manager, and identification manager, said order manager, and said processing manager.

16. A state machine processing system for processing at least one state machine, including a state machine computer program, the system comprising:
   means for storing a storage structure including a first memory;
   means for coupling, coupled with said storage structure and said state machine computer program, for coupling at least two attributes with a state machine selected from said at least one state machine;
   means for identifying, coupled with said storage structure and said state machine computer program, for identifying at least one value corresponding with the first attribute selected from said at least two attributes;

means for ordering, coupled with said storage structure and said state machine computer program, for determining a processing order based on said at least one value to process at least one second attribute selected from said at least two attributes;

means for processing, coupled with said storage structure and said state machine computer program, for processing said second attribute according to said order; and a processor means, coupled with said means for coupling, said means for identifying, said means for ordering, and said means for processing for processing said at least one state machine.

17. A computer-readable medium encoded with a computer program code for processing at least two state machines, the program code causing a computer to execute a method, for processing each state machine functionally characterized by at least one corresponding state machine attribute, comprising:
   (a) initializing said state machine by defining said at least one corresponding state machine attribute;
   (b) enabling each of said at least one state machines to function in accordance with said at least one corresponding state machine attribute; and
   (c) defining an order for processing each of said at least two state machines without context switching.

18. A router comprising:
a plurality of processors;
an input/output interface coupled with at least one of said plurality of processors;
at least one memory coupled with each of said processors, said memory storing procedures and data, said data including at least one attribute defining a state machine, said procedures including an interaction procedure for interacting with said at least one attribute, an order procedure, and a processing procedure that is coupled with said interaction procedure and said order procedure for executing said state machine without context switching.

19. The router of claim 18, wherein said at least one attribute is selected from a group of attributes consisting of a state attribute, a transition attribute, a guard condition attribute, and combinations thereof.

20. The router of claim 18, wherein said at least one attribute is selected from a group of attributes consisting of; a data attribute, a processing attribute, and combinations thereof.

21. The router of claim 20, wherein said data attribute is coupled with said interaction procedure, and said processing attribute is coupled with said processing procedure.

22. The router of claim 18, wherein said input/output interface is capable of receiving and sending a packet using said state machine.

23. A computer program product for use in conjunction with a computer system, the computer program product comprising a computer readable storage medium and a computer program mechanism embedded therein, the computer program mechanism comprising:
   a program module that directs computer system components to function in a specified manner including processing at least two state machines for said computer system, the program module including instructions for:
   (A) coupling at least one attribute with each of said at least two state machines;
   (B) interacting with said at least one attribute at (A);
   (C) determining an order for processing said at least two state machines; and
   (D) processing said at least two state machines using said interacting at (B) and said order at (C) without context switching.

* * * * *